United States Patent
Bösch

(10) Patent No.: US 9,753,135 B2
(45) Date of Patent: Sep. 5, 2017

(54) HAND-HELD DISTANCE-MEASURING DEVICE HAVING AN ANGLE-DETERMINING UNIT

(71) Applicant: LEICA GEOSYSTEMS AG, Heerbrugg (CH)

(72) Inventor: Thomas Bösch, Lustenau (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 211 days.

(21) Appl. No.: 14/421,368

(22) PCT Filed: Aug. 13, 2013

(86) PCT No.: PCT/EP2013/066938
§ 371 (c)(1),
(2) Date: Feb. 12, 2015

(87) PCT Pub. No.: WO2014/027002
PCT Pub. Date: Feb. 20, 2014

(65) Prior Publication Data
US 2015/0204976 A1 Jul. 23, 2015

(30) Foreign Application Priority Data

Aug. 16, 2012 (EP) ..................... 12180751

(51) Int. Cl.
*G01C 3/08* (2006.01)
*G01S 17/02* (2006.01)
(Continued)

(52) U.S. Cl.
CPC .......... *G01S 17/023* (2013.01); *G01B 11/026* (2013.01); *G01B 11/26* (2013.01);
(Continued)

(58) Field of Classification Search
CPC ....... G01B 11/26; G01B 11/026; G01S 17/08; G01S 17/46
(Continued)

(56) References Cited

U.S. PATENT DOCUMENTS 6,879,921 B2 4/2005 Bögel et al.
2009/0225161 A1* 9/2009 Otani ..................... G01C 11/12
348/135
(Continued)

FOREIGN PATENT DOCUMENTS

CN 101222533 A 7/2008
CN 102472818 A 5/2012
(Continued)

OTHER PUBLICATIONS

European Search Report dated Dec. 11, 2012 as received in Application No. 12 18 0751.
(Continued)

*Primary Examiner* — Mark Hellner
(74) *Attorney, Agent, or Firm* — Maschoff Brennan

(57) ABSTRACT

Some embodiments of the invention relate to a hand-held distance-measuring device, comprising a housing, a distance-measuring unit for measuring distances to spatial points along an emission direction in a space, an evaluating component, a dimensionally stable referencing support, and an angle-determining unit for determining an angle of rotation (a, between the housing and the referencing support. In some embodiments, the housing and the referencing support are designed in such a way and coordinated with each other in such a way that the referencing support can assume a passive position, in which the referencing support is inserted into an recess of the housing or is fastened such as to lie flatly against the housing. In some embodiments, the referencing support can assume a referencing position in which
(Continued)

the referencing support is connected to the housing at a first end of the referencing support by means of a joint.

20 Claims, 13 Drawing Sheets

(51) Int. Cl.
*G01B 11/26* (2006.01)
*G01C 15/00* (2006.01)
*G01B 11/02* (2006.01)
*G01S 17/08* (2006.01)
*G01S 17/46* (2006.01)

(52) U.S. Cl.
CPC ............ *G01C 15/002* (2013.01); *G01S 17/08* (2013.01); *G01S 17/46* (2013.01)

(58) Field of Classification Search
USPC ........................................................ 356/4.01
See application file for complete search history.

(56) References Cited

U.S. PATENT DOCUMENTS

| 2010/0225896 A1 | 9/2010 | Wolf et al. |
| 2011/0288818 A1 | 11/2011 | Thierman et al. |

FOREIGN PATENT DOCUMENTS

| CN | 202353632 U | 7/2012 |
| DE | 102 14 742 A1 | 10/2003 |
| DE | 10 2007 043 496 A1 | 3/2009 |
| DE | 10 2009 047 387 A1 | 6/2011 |
| EP | 0 701 702 A1 | 3/1996 |
| EP | 0 738 899 A1 | 10/1996 |
| GB | 2481695 A | 1/2012 |
| JP | 2008 116 249 A | 5/2008 |
| WO | 02/50564 | 6/2002 |
| WO | 2011/006739 A1 | 1/2011 |

OTHER PUBLICATIONS

EP Office Action dated Jul. 15, 2016 as received in Application No. 13748074.5.

* cited by examiner

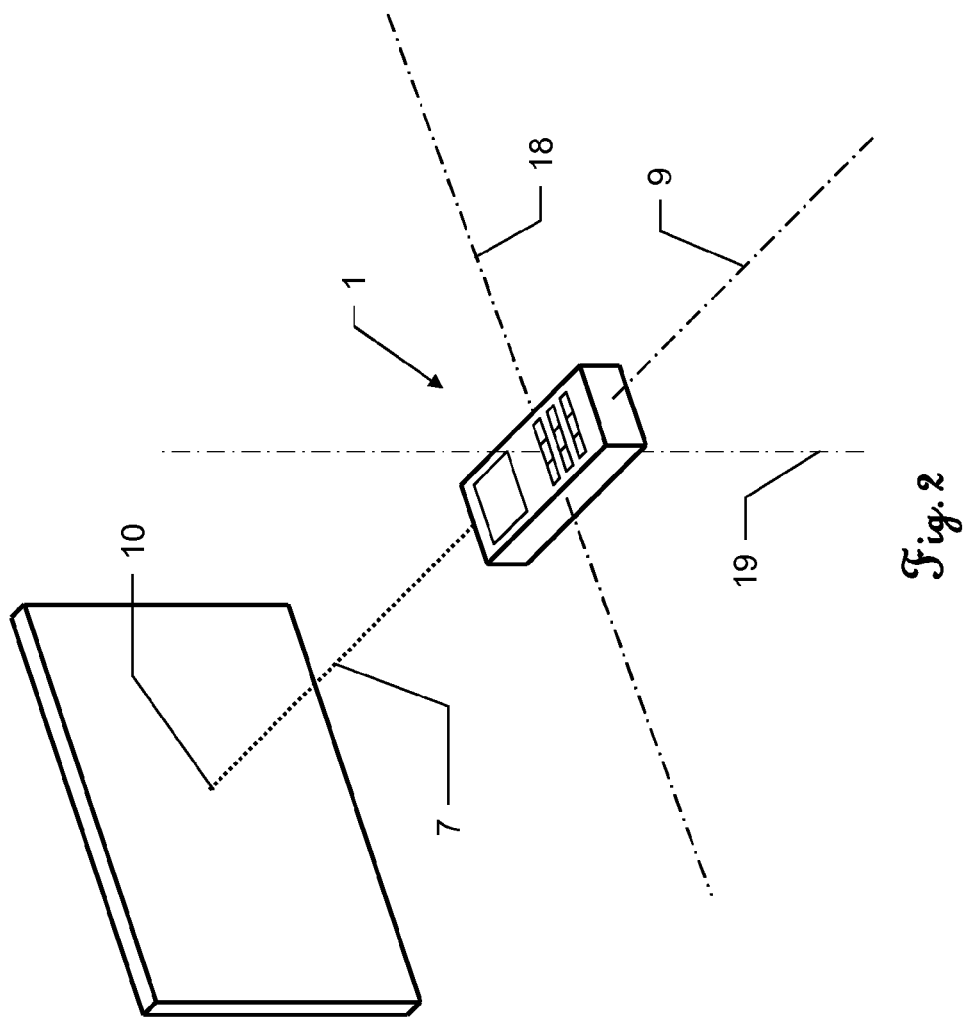
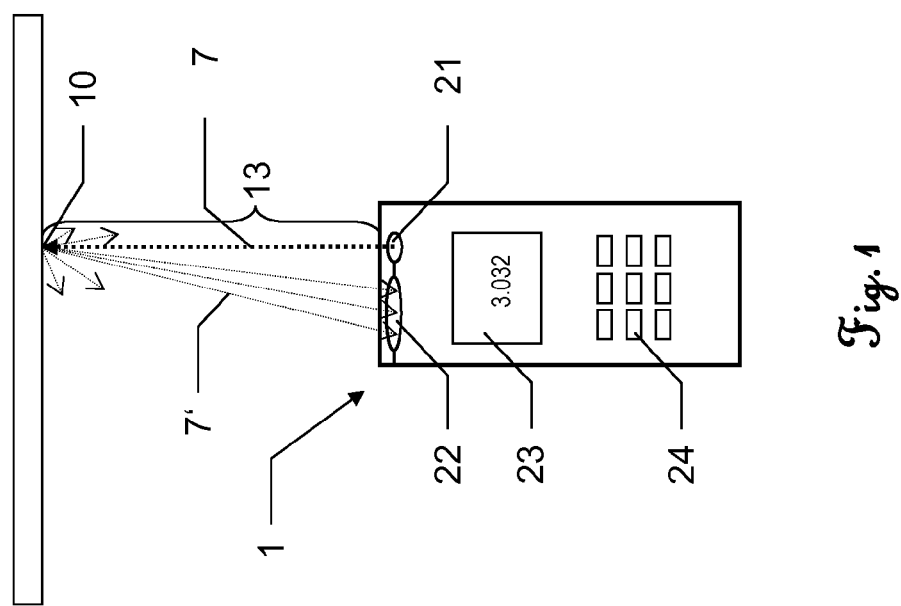

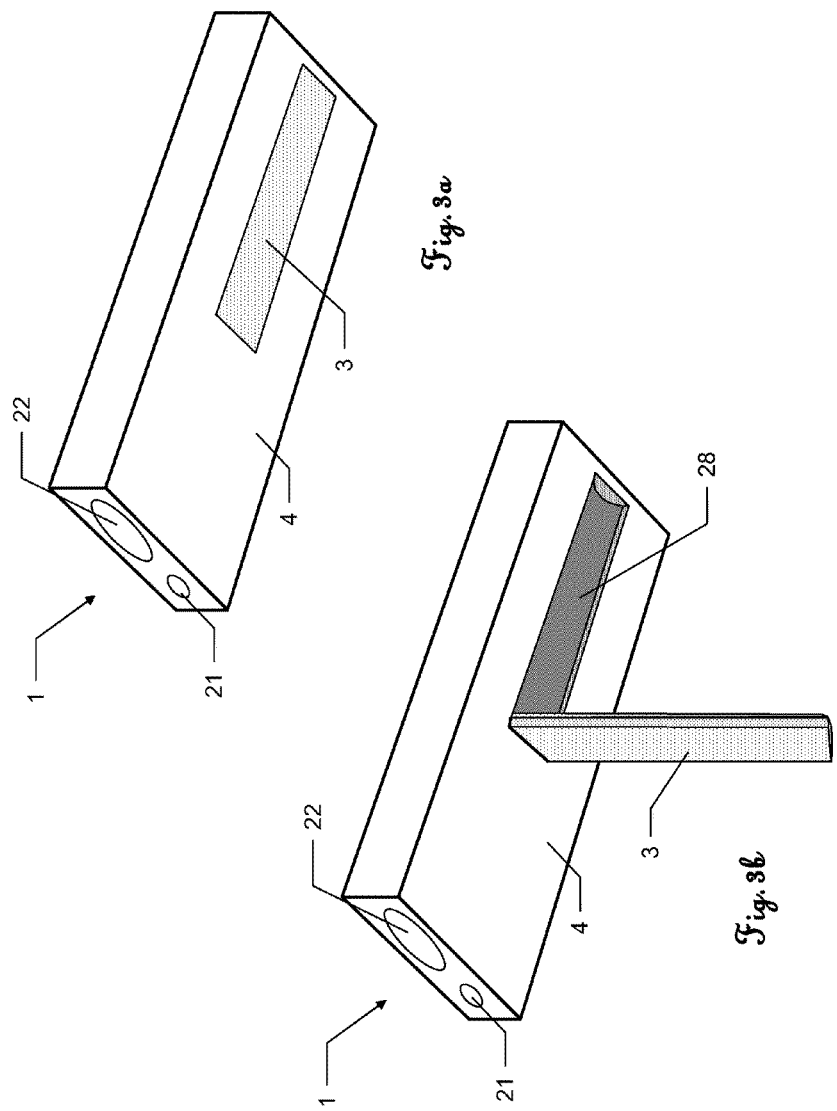

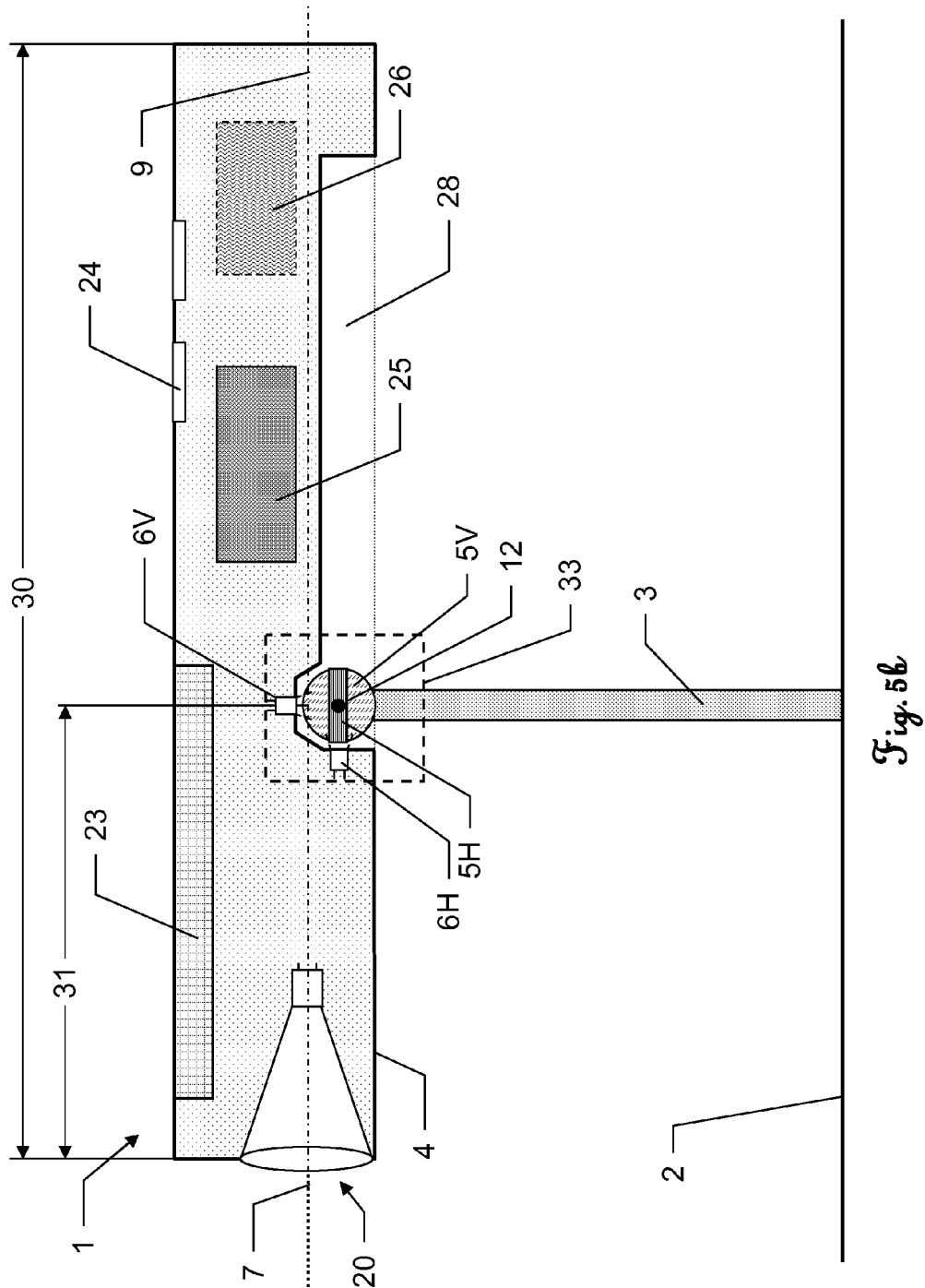

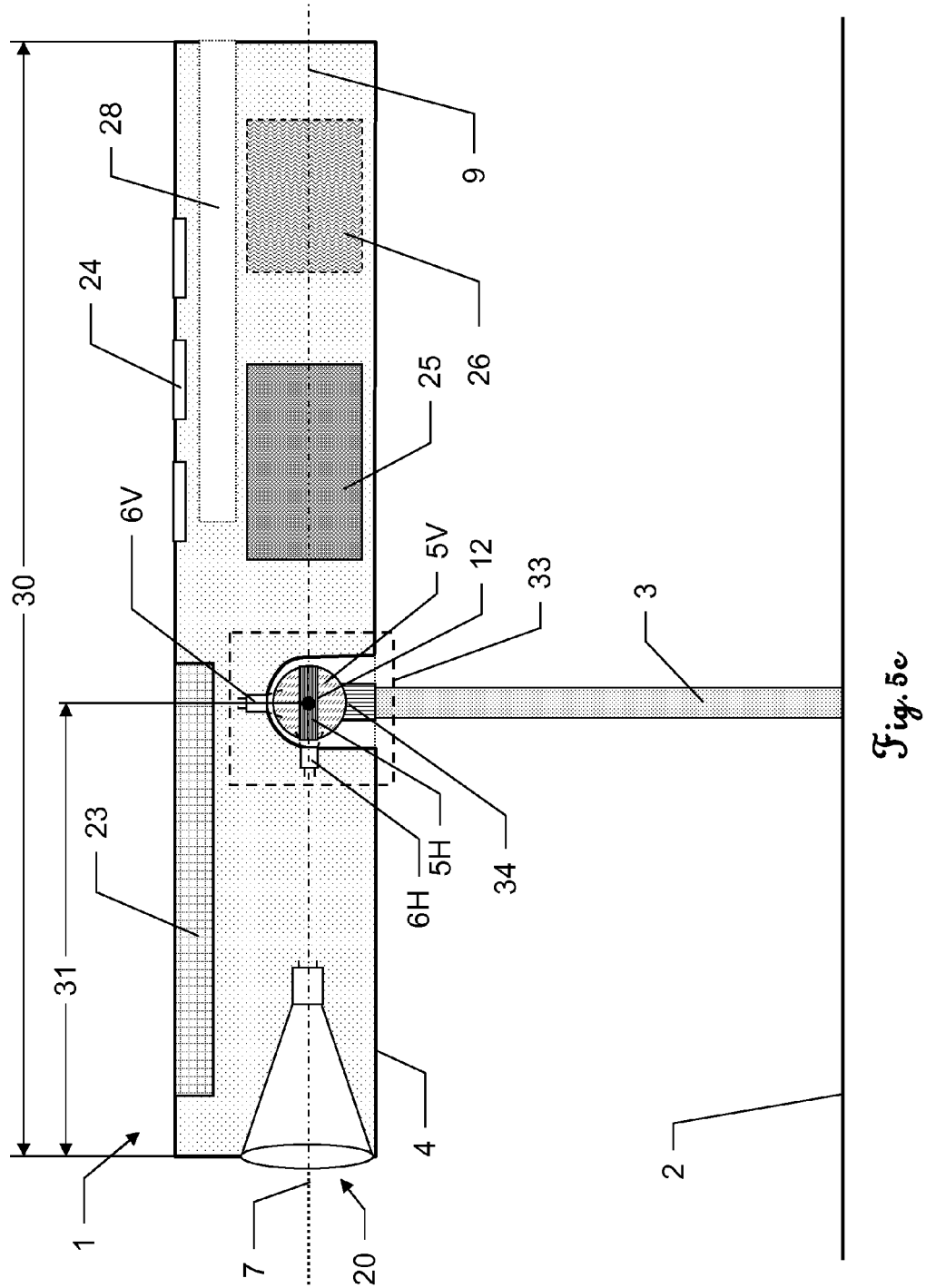

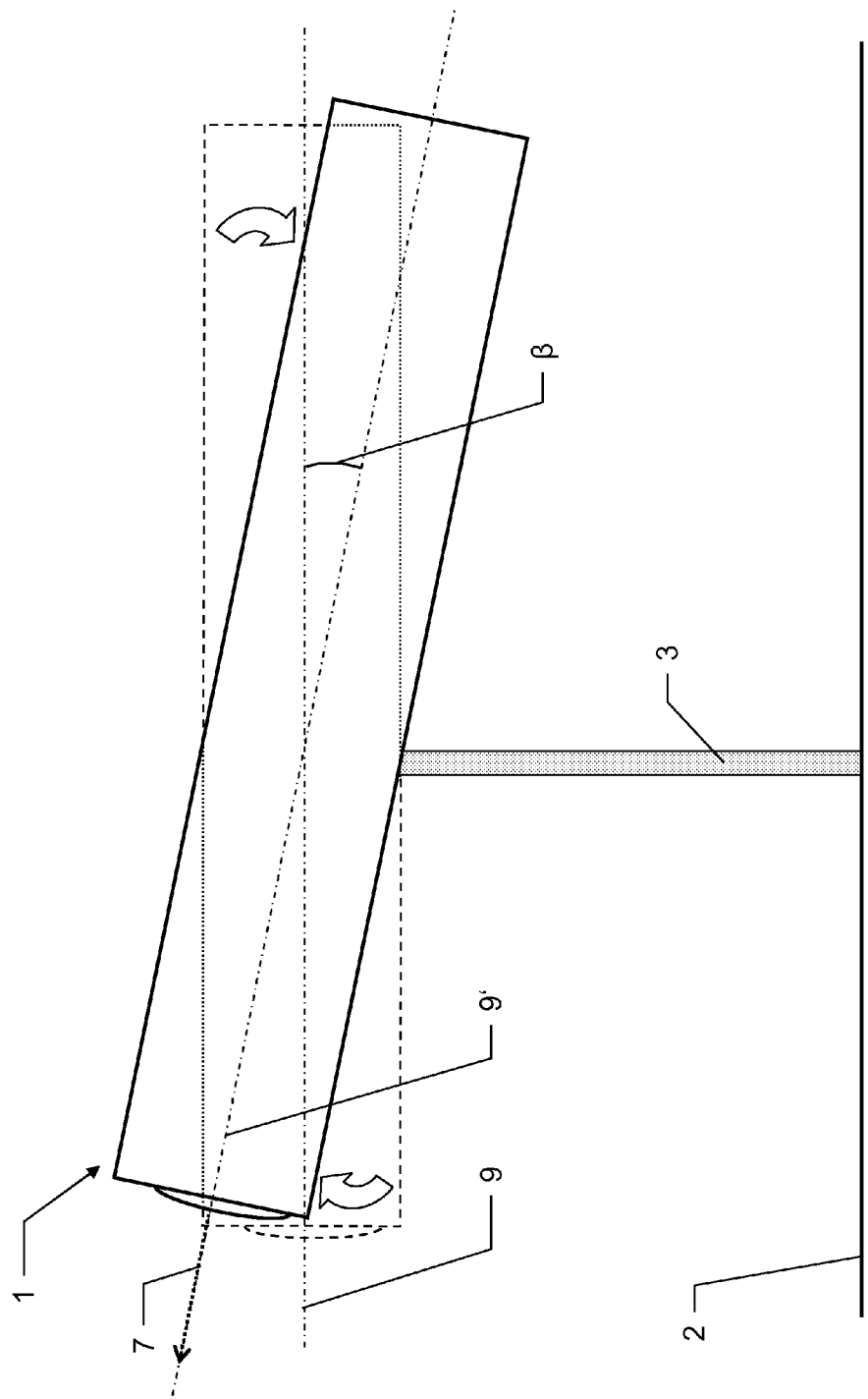

HAND-HELD DISTANCE-MEASURING DEVICE HAVING AN ANGLE-DETERMINING UNIT

FIELD OF THE INVENTION

The present invention relates to a hand-held distance measuring device comprising a distance measuring unit and an angle determining unit for determining spatial angles in relation to a reference coordinate system, by means of which three-dimensional coordinates of spatial points can be determined and displayed.

BACKGROUND

To this end, a hand-held distance measuring device according to the invention comprises a referencing support, which, more particularly, can be folded out and by means of which angles and changes in alignment of the distance measuring device relative to an external reference object, which is stationary in relation to a reference coordinate system, can be determined. The spatial alignment of the distance measuring device in relation to the reference object can, more particularly, be registered by means of angle measuring devices. Additionally, provision can be made for tilt sensors for determining the alignment in relation to the Earth's gravitational field vector.

Methods and systems for measuring distance are used in many applications. Examples for this include incredibly precise surveying in geodetic applications, and also measurement problems in the field of building installations or for industrial process controls.

For these objects, use is made of stationary, movable or else hand-held distance measuring devices, which perform an optical distance measurement to a selected measurement point. Here, a laser beam is usually emitted and, after reflection at the target, received back and evaluated. Here, the various measurement principles are available for determining the distance, such as e.g. a phase measurement or a time-of-flight measurement.

Particularly in the field of building installation or acceptance of construction work, use is made of portable devices, which are to be held in the hand and which, in respect of a structure to be measured, are applied and then perform a distance measurement to a surface. A distance measuring device suitable for such applications, which is typically hand-held, is described in e.g. EP 0 738 899 and in EP 0 701 702.

Since a measurement point that is visible on the surface to be measured is advantageous for most applications, use is usually made of red lasers as radiation sources for the distance measurement. Using rangefinders from the prior art, this thus allows accuracies down to the millimeter range to be obtained, while having great ease of handling. Using currently available hand-held distance measuring devices, it is possible to perform measurements from one point to another point with a line-of-sight connection. If the target is covered, a tilt sensor can also be used to establish horizontal mass.

One option for determining the distance between two points that can also be applied if there is no line-of-sight connection between the points lies in calculation by means of trigonometry. This is already sufficiently well known from ground-based surveying devices, such as theodolites or total stations.

For establishing a distance a between two spatial points B and C by trigonometry, it is enough to know the distance of these two points from a third point A, as well as the angle α at point A between sides b and c in the direction of points B and C. Then, the length of a can be calculated using the law of cosines:

$$a = \sqrt{b^2 + c^2 - 2 \cdot b \cdot c \cdot \cos\alpha}$$

Although a conventional hand-held distance measuring device from the prior art allows the distances b and c to the spatial points B and C to be measured exactly, a function for precise and reliable determination of the angle α is generally lacking. For the purposes of the distance calculation, currently available acceleration sensors cannot supply a sufficiently reliable value for α and compasses are susceptible to errors, particularly in internal rooms of buildings; at best, it is possible to establish angles from the vertical with a sufficiently high accuracy and reliability by means of inclination sensors.

The prior art has described various solutions with hand-held distance measuring devices with laser rangefinders, by means of which two points can be sighted simultaneously, wherein an angle can be determined between the emission directions of the two lasers.

The two documents DE 10 2007 043 496 A1 and JP 2008 116 249 A respectively disclose a hand-held distance measuring device which comprises two laser rangefinders which are rotatable in relation to one another, wherein the angle between these is determinable.

By contrast, DE 102 14 742 A1 describes a solution with two hand-held distance measuring devices which are connected to one another in a swivelable manner, wherein the mechanical connection between the two distance measuring devices comprises means for registering the angle.

A disadvantage in all these solutions lies, in particular, in the increased material outlay since two laser measurement modules or even two complete distance measuring devices are respectively required for the measurement.

SUMMARY

Some embodiments of the present invention provide a hand-held distance measuring device which allows three-dimensional coordinates of at least two spatial points within a common reference coordinate system to be determined.

Some embodiments of the invention lie in providing such a distance measuring device with little design outlay and, in particular, without the requirement of clamping the distance measuring device into a separate angle measuring apparatus.

Some embodiments of the invention provide such a hand-held distance measuring device which is equipped with only a single laser rangefinder.

The hand-held distance measuring device of the present invention is able to register exactly spatial angles in a reference coordinate system, both in the vertical and in the horizontal direction, as a result of which the establishment of a precise distance between two spatial points measured in succession is made possible by means of a simple trigonometric calculation.

To this end, according to the invention, the distance measuring device is connected by means of a referencing support—which can preferably be folded out—to a reference object which is stationary—at least during the measurement process—relative to the reference coordinate system in order to register changes in the spatial alignment of the distance measuring device in relation to the reference object. By way of example, this reference object can be a tabletop, a tripod or part of the Earth's surface or the floor.

With one end, the referencing support is attached to the distance measuring device in a rotatable manner, preferably in a three-dimensionally rotatable manner. By way of example, a referencing support according to the invention may consist of e.g. plastic or a light metal and be present in the form of a pin which can be folded out of the distance measuring device in the downward direction.

At the lower end, this pin may have a base or means for attachment to a base, a socket or a tripod. For improved fixation of the referencing support on a smooth surface, such as e.g. a tabletop, the lower side can optionally be rubberized or equipped with a suction cup.

Alternatively, the referencing support can also be designed to be pulled out in a telescopic manner or screwed or inserted into receptacle means of the distance measuring device.

For the purposes of the measurement, it is also possible that the referencing support is not placed onto a surface but rather held in one hand by a user during the measurements, while the other hand aligns the distance measuring device, provided the hand holding the referencing support is not moved between the measurements. However, the accuracy of the measurements in this case can be adversely affected by natural body movements such as trembling or the rising and lowering of the rib cage by respiration.

A hand-held distance measuring device according to the invention contains a function for registering a point in the space, at least by measuring the distance between the distance measuring device and the object to be measured by means of a visible laser beam. The location of the point to be registered in three dimensions is determined in the distance measuring device, for example by angle sensors and/or inclination sensors.

The hand-held distance measuring device according to the invention contains a distance measuring module for measuring the distance to spatial points situated on surfaces. The distance measuring module is preferably a laser rangefinder which emits a laser beam, more particularly a visible laser beam, in the direction of a point to be measured. To this end, the distance measuring module comprises an optical unit, for example embedded into the housing of the distance measuring device. For the purposes of an optical measurement of the distance to a surface, the apparatus emits optical transmission rays, modulated by the optical unit, in the form of a radiation beam against the surface. Some of the rays of the transmission rays reflected at the surface are collected by the optical unit and evaluated electronically for determining distances.

The hand-held distance measuring device according to the invention furthermore preferably contains an inclination sensor for registering at least one longitudinal inclination of the device. The determination of the location of the hand-held distance measuring device in the space can be established in a fully automatic manner in relation to the reference coordinate system by means of the inclination sensor. All location errors of the hand-held distance measuring device can, as a result thereof, be compensated for fully automatically.

By integrating additional components for measuring angles (angle determining unit), the distance measuring device according to the invention is able to measure horizontal and vertical spatial angles, a transverse inclination of the laser rangefinder or of the horizontal axis of the distance measuring device, a longitudinal inclination of the laser rangefinder and a longitudinal inclination of the horizontal axis in addition to measuring distances. By means of these measured values, an evaluation unit can establish corrected three-dimensional coordinates which, inter alia, can be used for calculating horizontal and oblique distances between spatial points.

According to the invention, these additional components of the angle determining unit, suitable for determining an angle, comprise either an inclination sensor and a rotary encoder which, in particular, is embodied to register horizontal angles or two rotary encoders, one of which registers vertical angles and a rotary encoder which registers horizontal angles. Optionally, there may additionally be a two-axis inclination sensor on the horizontal axis, a compass and/or a gyroscope.

A first alignment of the system can optionally be brought about on the basis of a compass or a GPS sensor. For measuring angles according to the invention, use can be made of rotary encoders operating both on incremental and on absolute principles, i.e. incremental encoders or absolute rotary encoders.

In a preferred embodiment, the hand-held distance measuring device according to the invention comprises at least one rotary encoder. The rotary encoder or encoders are arranged in the angle determining unit in an integrated mechanical system.

In particular, the angle determining unit is arranged in such a way that at least one rotary encoder is provided on the referencing support or, preferably, in the interior of the distance measuring device at an attachment for the referencing support, said at least one rotary encoder being able to register a relative alignment of the housing of the distance measuring device in relation to the referencing support and/or a spatial angle between two alignments of the distance measuring device, at least in the horizontal plane, but preferably also in the vertical direction. Alternatively, a vertical alignment can also be established by an inclination sensor. This inclination sensor can be attached to the horizontal axis of rotation in order to determine an absolute height reference in each position of the distance measuring device. As a result of the integrated inclination sensor, the distance measuring device is able to display heights and coordinates in absolute terms.

The referencing support of the distance measuring device can preferably comprise sensors for registering and compensating measurement errors. There can be wobbling of the referencing support or of the whole distance measuring device, particularly in the case where the referencing support is held by hand on a reference point of the reference object by the user. Wobbling during a measurement process or between two or more measuring processes can lead to measurement errors. Therefore, the distance measuring device can preferably comprise additional inclination sensors in the referencing support or on the connection to the housing, for example on the angle determining unit, which sensors enable the determination of the spatial alignment of the referencing support. The alignment or change in alignment of the support can then be used for dynamically determining the location of the distance measuring device relative to the reference point and can then be taken into account when calculating spatial coordinates.

The hand-held distance measuring device according to the invention can measure distances between two points without a reference point needing to be directly accessible. The distance measuring device can thus represent the extent of the span between two arbitrary points that can be targeted by the laser spot.

The hand-held distance measuring device can mark out predetermined coordinates relative to the first measurement point and signal them to the user. Likewise, the vertical position of any arbitrary point can be displayed.

Areas of geometric shapes lying in the space, which are defined by at least three measurement points, can be calculated automatically. Geometric shapes can automatically be fitted into a recorded measurement image, and the dimensions thereof can be established. Using the recorded measurement image, the measurement points can be shifted to the desired position. The measurement coordinates are automatically extrapolated in the process.

In a further embodiment, the distance measuring device according to the invention comprises a targeting aid, for example in the form of a grip, or means for receiving such a targeting aid. Precisely targeting a measurement point is made simpler by such a targeting aid, which, for example, can be folded out or pulled out or screwed or attached in any other way at the end of the distance measuring device lying opposite to the laser rangefinder.

In an alternative embodiment, the distance measuring device according to the invention is embodied as an attachment module for a hand-held small computer, for example a tablet computer or a smartphone. Here, a display, input means and inclination sensors can preferably be dispensed with in the attachment module since these are generally provided by current tablet computers and smartphones. Likewise, digitally available distance values can be stored and processed further by an evaluation component of the connected device. The data can be interchanged between the distance measuring device, embodied as an attachment module, and the small computer by means of a wireless connection, for example by means of Bluetooth or WLAN, or else by means of a standardized data interface, for example embodied as a USB interface. Such an attachment module can either be embodied for holding a small computer with precisely defined dimensions, for example a specific type of smartphone, or for devices with different sizes and/or of different types. The distance measuring device is operated and the results are displayed by means of the device connected to the attachment module. Software for performing the distance measurement by means of this embodiment can preferably be transmittable from the attachment module to the small computer or installable in any other way, for example by means of a free or chargeable download from the Internet.

The attachment module may comprise a camera which records images in the direction of the emission direction of the laser beam, which images can be displayed to a user by means of the display of the connected device. If the connectable device comprises a camera attached to the side facing the attachment module, the attachment module can preferably also comprise deflection means, for example a mirror, which deflects the camera image in the direction of the emission axis of the laser beam.

BRIEF DESCRIPTION OF THE DRAWINGS

The hand-held distance measuring device according to the invention and the measurement method according to the invention are explained in more detail below as examples of embodiments which are schematically depicted in the drawings, with further advantages of the invention also being discussed. In detail:

FIG. 1 shows a hand-held distance measuring device according to the invention, comprising a laser rangefinder;

FIG. 2 shows a hand-held distance measuring device according to the invention and the three axes of rotation of the reference coordinate system;

FIG. 3a shows a hand-held distance measuring device according to the invention, comprising a folded-in referencing support;

FIG. 3b shows a hand-held distance measuring device according to the invention, comprising a folded-out referencing support;

FIG. 5b shows a second example embodiment of a hand-held distance measuring device according to the invention, in a longitudinal sectional view;

FIG. 5c shows a third example embodiment of a hand-held distance measuring device according to the invention, in a longitudinal sectional view;

FIG. 5e shows a hand-held distance measuring device according to the invention, in a side view with two different alignments of the housing—in relation to a vertical angle relative to the referencing support.

DETAILED DESCRIPTION

Figure 4A:
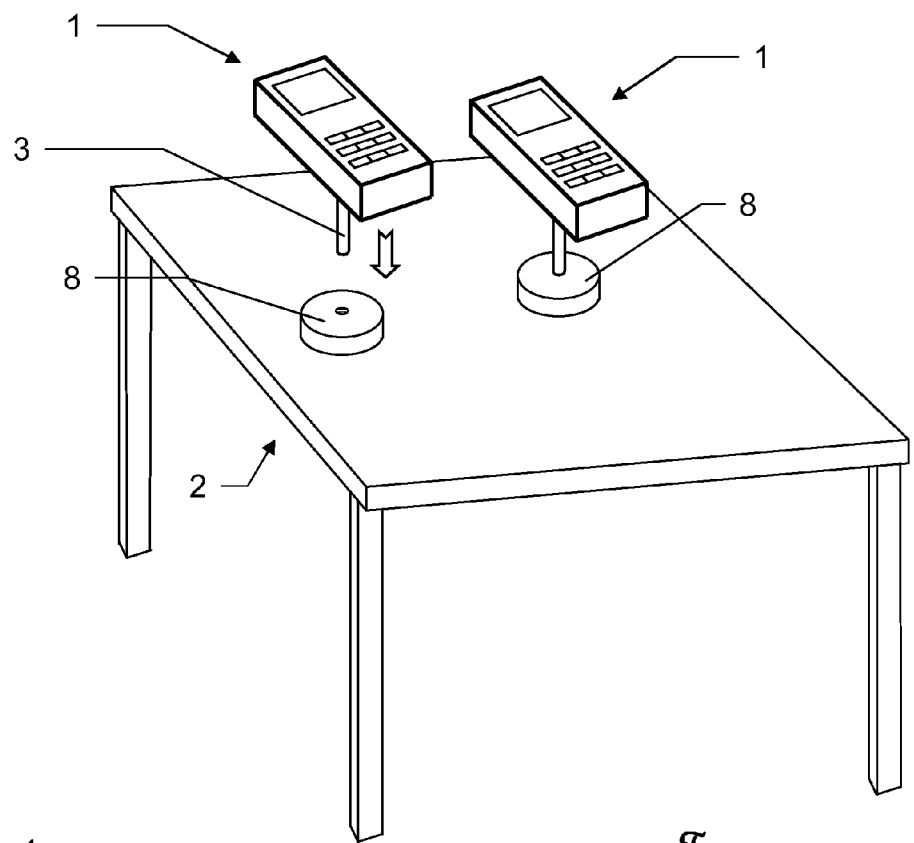
FIG. 4a shows a combination of a hand-held distance measuring device according to the invention and a base.

FIG. 1 shows, in an external view, a generic hand-held distance measuring device 1 for measuring distances. It comprises a housing in which the necessary electronic components are arranged. Here, the housing is embodied in such a way that the distance measuring device 1 can be held in the hand and also be placed or fastened in a defined manner onto a point to be measured. To this end, appropriate abutment edges or stop elements that can be folded out or stuck on may be attached, as described in e.g. WO 02/50564, to the housing. On the front side thereof, the distance measuring device 1 contains a laser rangefinder 20 comprising a laser emission unit 21 and a laser reception unit 22, which have optical openings in the housing. A display apparatus 23 in the form of a display and input means 24 in the form of a keypad are situated on the upper side of the device. Moreover, provision can be made for a camera—not depicted here—for recording images in the direction of the emission direction.

According to the invention, the laser emission unit 21 emits a laser beam 7 to a measurement point 10 on a wall. The wall has a naturally rough surface, from which optical radiation is reflected in a scattered manner. Some of the scattered reflected rays 7' are collected, detected and converted into an electrical signal by the laser reception unit 22. The signal is evaluated in a manner known per se by an electronic circuit in order to determine the digital value of the distance 13. By way of example, a phase or time-of-flight measurement can be used for establishing the distance. Here, the extent between the laser reception unit 22 and a measurement stop is also taken into account. The value of the measured distance 13 digitally established by the evaluation—in this case e.g. 3.032 meters—is then made available to a user on the display 23.

FIG. 2 shows the hand-held distance measuring device 1 according to the invention, which emits a laser beam in the emission direction 9 to a measurement point 10. The axes of rotation extending orthogonal to the emission direction 9 are also depicted: the transverse axis 18 and the vertical axis 19.

FIGS. 3a and 3b show, in a view from obliquely below, an embodiment of the hand-held distance measuring device 1 according to the invention, comprising a laser emission unit 21 and a laser reception unit 22. A referencing support 3 in the form of a pin that can be folded out is integrated into a cutout 28 in the housing 4 of the distance measuring device 1. In FIG. 3a, the referencing support 3 is folded in, and so it terminates flush with the surface of the housing 4. In FIG. 3b, the referencing support 3 is folded out and assumes approximately a right angle with respect to the housing 4. In this position, the referencing support 3 can be rotated and swiveled and tilted in three dimensions in relation to the distance measuring device 1. The lower end of the referencing support 3 can be placed onto a point of a reference object 2 (reference point) or fixed into a receptacle provided for this purpose, for example the receptacle of a base 8 or a tripod.

Figure 4B:
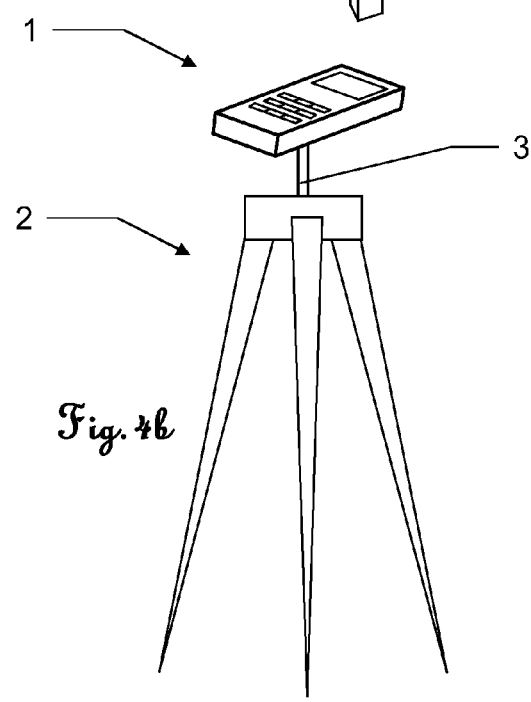
FIG. 4b shows a combination of a hand-held distance measuring device according to the invention and a tripod.
Figure 4C:
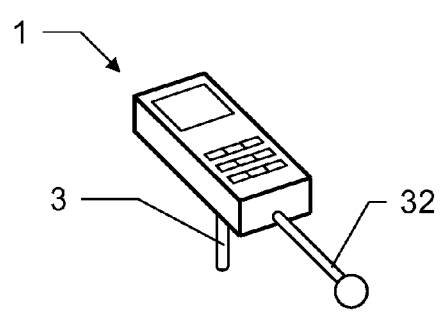
FIG. 4c shows a hand-held distance measuring device according to the invention, comprising a targeting aid.

FIGS. 4a and 4b depict how the distance measuring device 1 can be connected by means of the referencing support 3 to a reference object 2 which is stationary relative to a reference coordinate system—at least for the period of time of one or more measurements.

In FIG. 4a, the referencing support 3 of the distance measuring device 1 is connected to a base 8 which ensures a secure stand on a surface of a reference object 2, for example a tabletop. Then, the distance measuring device 1 and the referencing support 3 need not be held continuously by hand, and the measurement accuracy is increased.

In FIG. 4b, the reference object 2 is a tripod. The referencing support 3 of the distance measuring device 1 is connected directly to the tripod. The referencing support 3 can be connected to the base 8 or the reference object 2 by means of, in particular, a screw-in or plug-on connection.

Figure 5A:
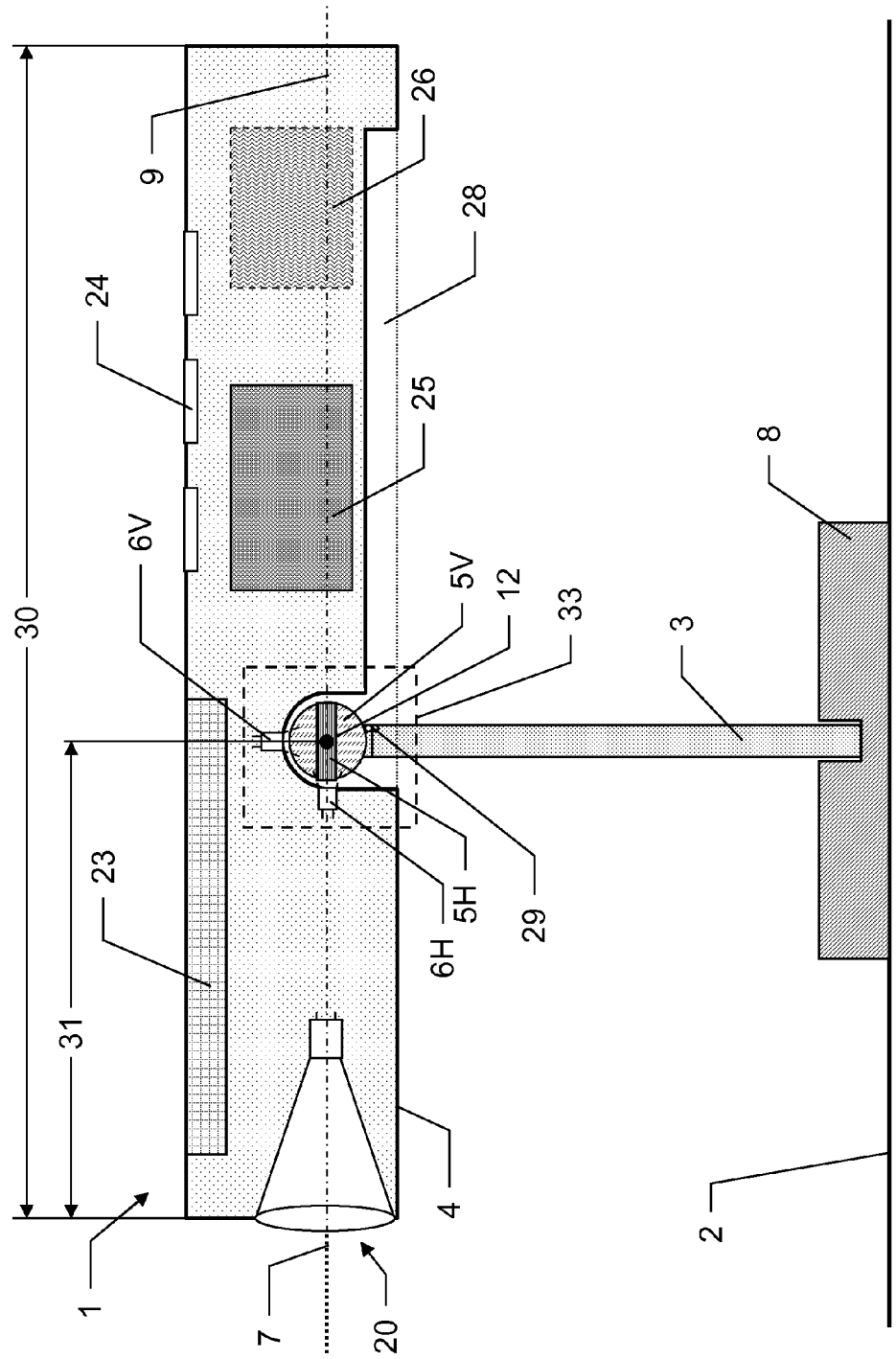
FIG. 5a shows a first example embodiment of a hand-held distance measuring device according to the invention, in a longitudinal sectional view.

FIG. 5a depicts a longitudinal section through a first preferred embodiment of the hand-held distance measuring device 1 according to the invention. The referencing support 3 is folded out into the referencing position by means of a hinge 29 and connected to a base 8 standing on a reference point on the surface of a reference object 2. The distance measuring device 1 contains a laser rangefinder 20 with a laser beam 7 emitted in the emission direction 9. Moreover, a display 23, input means 24 and the cutout 28 for the referencing support 3 in the housing 4 are depicted. An angle determining unit 33, an evaluation component 25 and an inertial sensor 26 are shown as internal components. Two rotary encoders 5H, 5V with associated sensors 6H, 6V which are able to detect the horizontal and vertical angles between two spatial alignments of the distance measuring device 1 relative to the referencing support 3 are provided as components of the angle determining unit 33 on the connection, rotatable in three dimensions about the rotary point 12, of the referencing support 3 with the distance measuring device body. The axis of the emission direction 9 extends through the rotary point 12, which is situated at a known partial distance 31 of the likewise known overall length 30 of the distance measuring device 1 from the front side thereof. In particular, this enables simpler computational operations. Moreover, the distance measuring device 1 contains an energy source (not depicted here), more particularly a battery or a rechargeable battery, which provides electrical power for the electrically operated components of the distance measuring device 1.

A digitally available distance value can—as is currently conventional in the case of optically measured distances—be stored, processed further or transmitted and displayed to a user on the display 24 by the evaluation components 25 of the device.

In FIG. 5b, the referencing support 3 can be folded about the rotary point 12 into the cutout 28, and so no additional hinge is required.

Figure 5D:
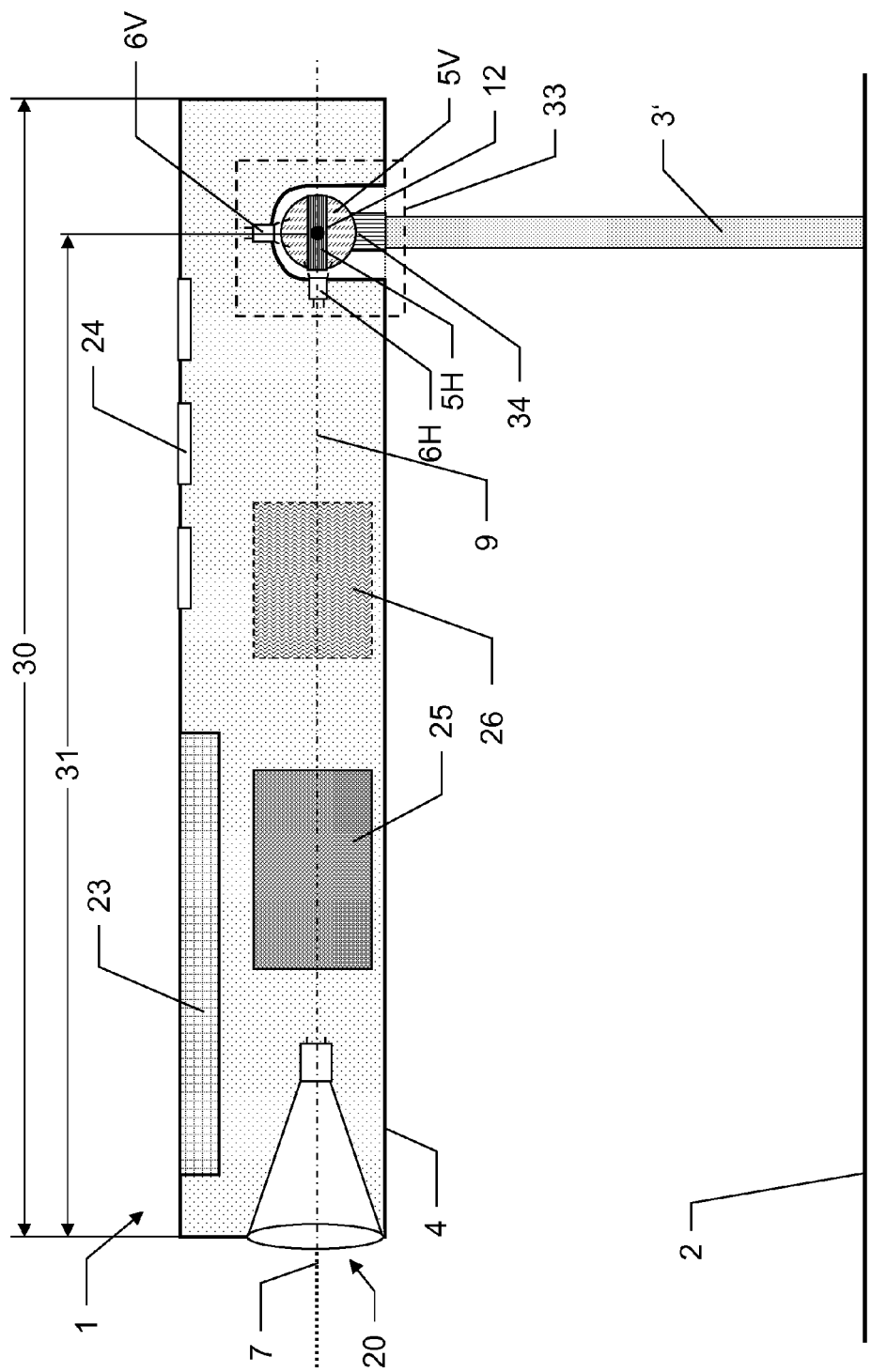
FIG. 5d shows a fourth example embodiment of a hand-held distance measuring device according to the invention, in a longitudinal sectional view.

FIGS. 5c and 5d show two alternative embodiments of the hand-held distance measuring device 1 according to the invention. In FIG. 5c, the referencing support 3 is designed to be removable and connected to the angle determining unit 33 by means of the connection element 34, more particularly by a screw-in or plug-on connection. At its rear end, the housing 4 has an opening through which the referencing support 3 can be placed into the cutout 28 after use. FIG. 5d depicts a further alternative embodiment of the hand-held distance measuring device 1 according to the invention. The angle determining unit 33 is in this case attached to the rearward region of the device. A referencing support 3 can be plugged onto or screwed into the connection element 34, said referencing support being stored separately from the remainder of the distance measuring device 1 in the removed state or attachable to an optionally provided holder (not depicted here) on an external side of the housing 4.

FIG. 5e shows a side view of a distance measuring device 1 according to the invention. Dashed lines depict a first alignment of the housing with a first emission direction 9; full lines depict a second alignment with a second emission direction 9'. The alignment of the referencing support 3 remains unchanged when there is a change in the alignment of the housing, and so an angle—depicted here, the vertical tilt angle β—between the two alignments can be registered by an angle determining unit of the distance measuring device 1.

In order to be able to preclude measurement errors as a result of inadvertent changes in the alignment of the referencing support during a measurement process or between two or more measurement processes, an inclination sensor—not depicted here—is preferably provided in or on the referencing support 3, said inclination sensor being embodied in such a way that it can detect, in particular in a dynamic continuous manner, a current alignment of the referencing support 3. As a result, it is possible to determine the relative location of the distance measuring device 1 in relation to the reference point dynamically. Changes in alignment that may have occurred during the measurements or between the measurements, for example as a result of wobbling or trembling of the hand of the user, are thus registered and can be included in the calculation of the angles and distances.

If a secure connection is established between the referencing support 3 and the reference object 2, like e.g. when using the base 8 or tripod aids depicted in FIGS. 4*a* and 4*b*, it is possible to dispense with an inclination sensor in the referencing support 3 since there cannot be a change in the relative alignment of the referencing support 3.

Figure 6A:
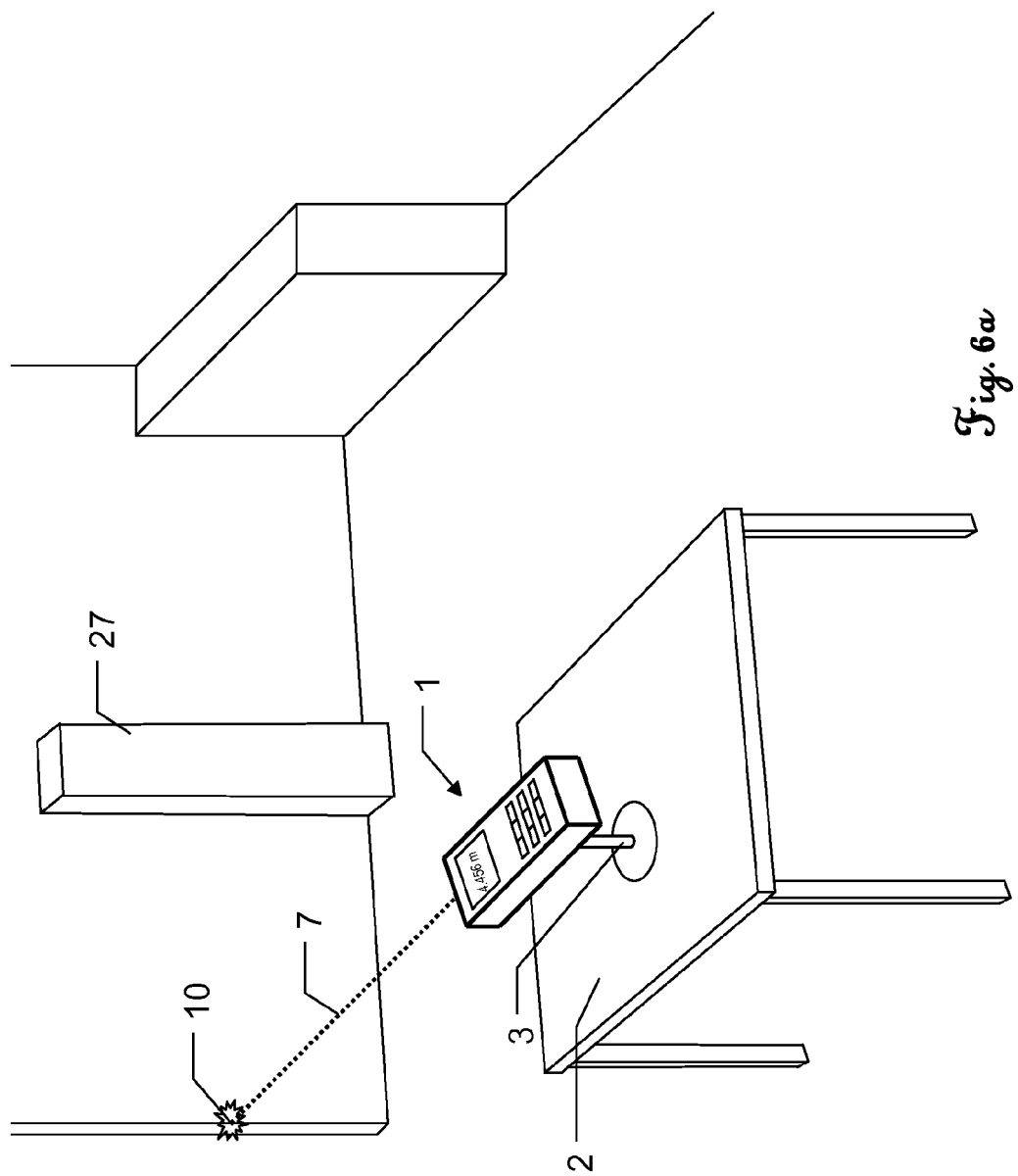
FIG. 6a shows an example embodiment of the hand-held distance measuring device according to the invention when measuring the distance to a first measurement point.
Figure 6B:
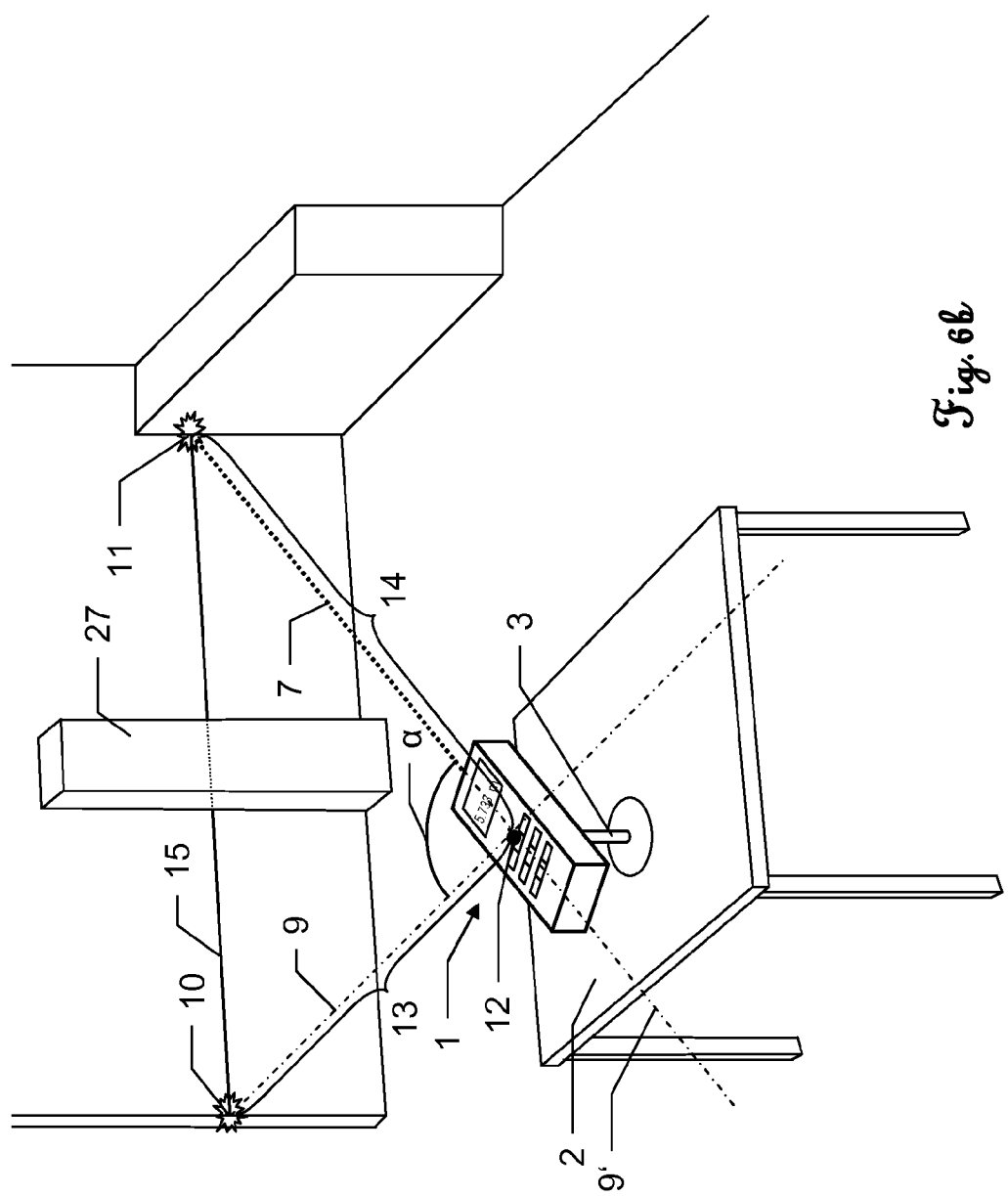
FIG. 6b shows an example embodiment of the hand-held distance measuring device according to the invention when measuring the distance to a second measurement point.

FIGS. 6*a* and 6*b* depict a method for how the distance measuring device 1 according to the invention can be used to establish a distance 12 between two distant measurement points, for example if an obstacle 27 prevents a direct measurement from point 10 to point 11.

FIG. 6*a* shows an example embodiment of the hand-held distance measuring device 1 according to the invention when measuring the distance to the first measurement point 10. To this end, the distance measuring device 1 is connected at a reference point via the referencing support 3 to a reference object 2 (depicted here as a table) which is stationary relative to a reference coordinate system—at least for the period of the measurement sequence—and said distance measuring device emits a laser beam 7 in the direction of the first measurement point 10.

FIG. 6*b* shows the hand-held distance measuring device 1 according to the invention during the measurement to the second measurement point 11. Here, the position of the referencing support 3 at the reference point on the reference object 2 remains unchanged in relation to the first measurement; only the housing 4 is newly aligned around the rotational point 12. An angle measuring device then establishes a—horizontal and/or vertical—angle α between the first emission direction 9 and the second emission direction 9′. The evaluation unit calculates the distance 15 between the measurement points 10, 11 from the established angles and the measured distances 13, 14 between the rotational point 12 and the measurement points 10, 11.

Figure 7:
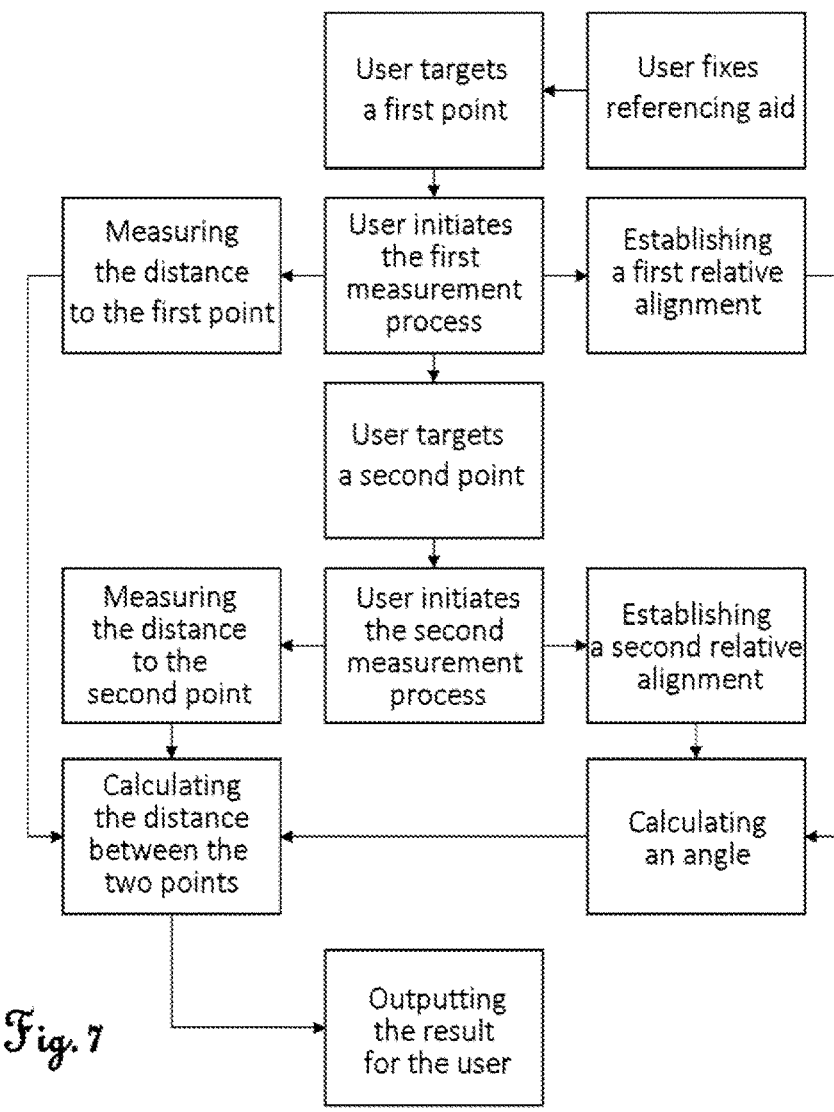
FIG. 7 shows a flowchart for measuring the distance between two distant spatial points.

FIG. 7 depicts a flowchart which illustrates the individual steps of the measurement method shown in FIGS. 6*a* and 6*b*, which are executed after the start of the method. In order to start the method, the user selects the appropriate method by means of the input means 24 and fixes the referencing support 3 on a reference object 2 at the reference point. Then, the user targets the first measurement point 10 with the laser beam 7 of the distance measuring device 1 and initiates the measurement process by means of the input means 24. The evaluation unit establishes and stores the values for the distance and the alignment established by the laser rangefinder 20, angle sensors 6H, 6V and inclination sensors. The user swivels the housing 4 of the distance measuring device 1 (without releasing the fixation of the referencing support 3 on the reference point) and targets the second measurement point 11. By triggering the measurement process, the evaluation unit 25 establishes and stores a further distance and alignment. From the values for the alignment of the housing 4, the evaluation unit 25 initially calculates an angle α. This angle and the measured distances are used for calculating the distance between the two measurement points. The result is displayed to the user on a display.

Figure 8:
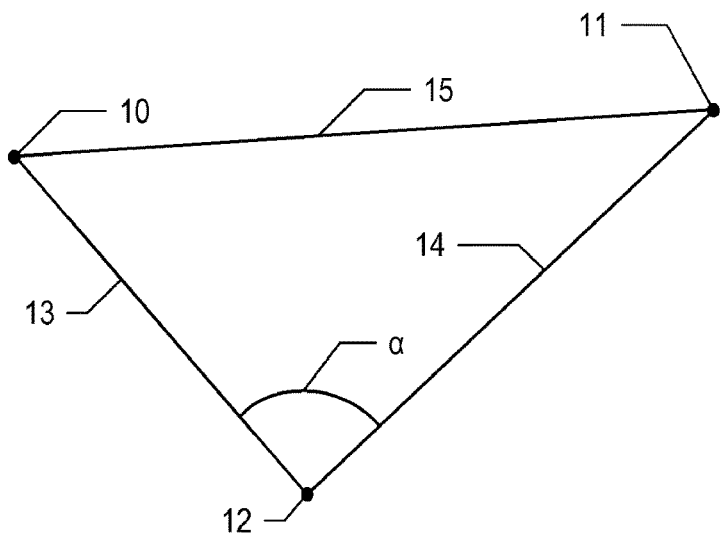
FIG. 8 shows a diagram for measuring the distance between two distant spatial points.

FIG. 8 shows the trigonometric basis of the method according to the invention. The length of a path 15 can be calculated by means of the known distances 13, 14 from an arbitrary spatial point 12 to the end points 10, 11 of the path 15 and the angle α between the directions from the spatial point 12 to the end points 10, 11. To this end, use can be made of, in particular, the law of cosines.

FIGS. 9*a* to 9*e* depict example measurement methods which can be performed using the hand-held distance measuring device 1 according to the invention.

Figure 9:
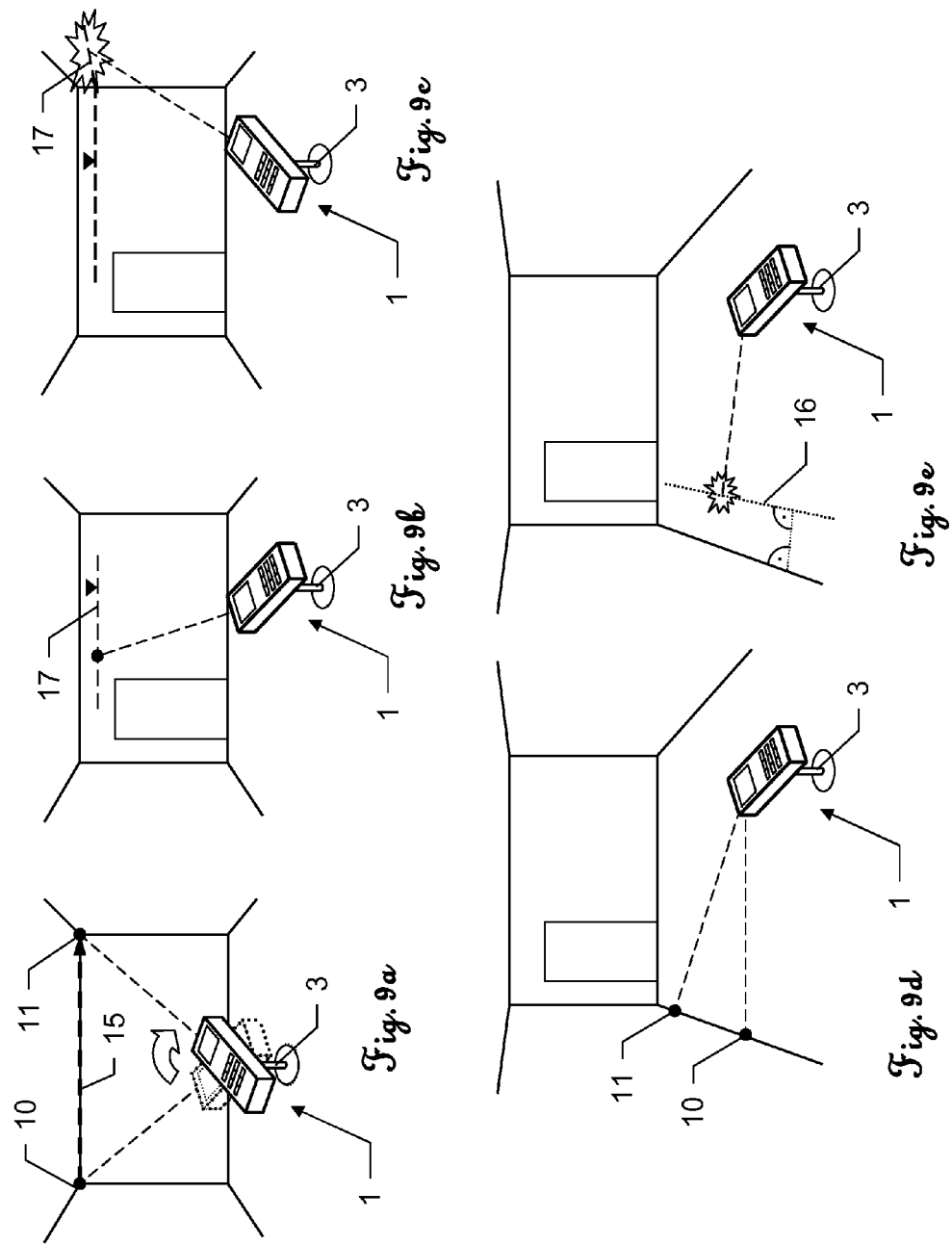
FIGS. 9a-e show various application examples for the hand-held distance measuring device according to the invention.

FIG. 9*a* illustrates a method for determining an extent of the span, i.e. a distance between two points, from a distant location. To this end, a first measurement point 10 is initially targeted and measured. Then, the distance measuring device 1 is swiveled in order to target a second measurement point 11, the distance 15 of which from the first measurement point 10 is intended to be established. Here, in particular, a continuous measurement mode ("tracking mode") is possible, in which the distance 15 to the first measurement point 11 is displayed on the display for each targeted point.

FIGS. 9*b* and 9*c* illustrate a method for easily determining a vertical distance of a measurement point from a horizontal plane 17, which is defined by a first measurement point 10. To this end, a reference height (e.g. a point on a wall) is measured after starting the application. Subsequently, the reference height is transferred to an arbitrary point. To this end, the distance measuring device 1 is, for example, aligned at a point on a different wall and the measurement is triggered. The display then depicts a relative height of the laser spot in relation to the horizontal plane defined by the reference height. By means of an orientation variation in terms of elevation of the distance measuring device 1 and a renewed measurement, it is possible, for example, to mark a second measurement point at the same height, or at a desired different height. Here, a continuous measurement mode ("tracking mode") is also possible, in which reaching of the reference height or a different height set by the user is displayed automatically or the distance of a current measurement point from this height is displayed continuously.

FIGS. 9*d* and 9*e* illustrate a further method that can be performed by means of the hand-held distance measuring device according to the invention. By means of the depicted method, it is possible to determine an orthogonal distance of a measurement point from a straight line which is defined by two first measurement points 10, 11. To this end, the user initially targets a measurement point 10 and measures the distance thereof and the current alignment of the distance measuring device 1. The user subsequently repeats this with a second measurement point 11. As a result of this, a straight line through the two measurement points 10, 11 is defined. All measurements are treated as a projection onto the horizontal. The user now targets a third measurement point; the display depicts the distance of this point from the straight line. The user can now move the laser spot until a desired distance is found. In particular, this function can determine a parallel line 16 to the straight line.

Figure 10:
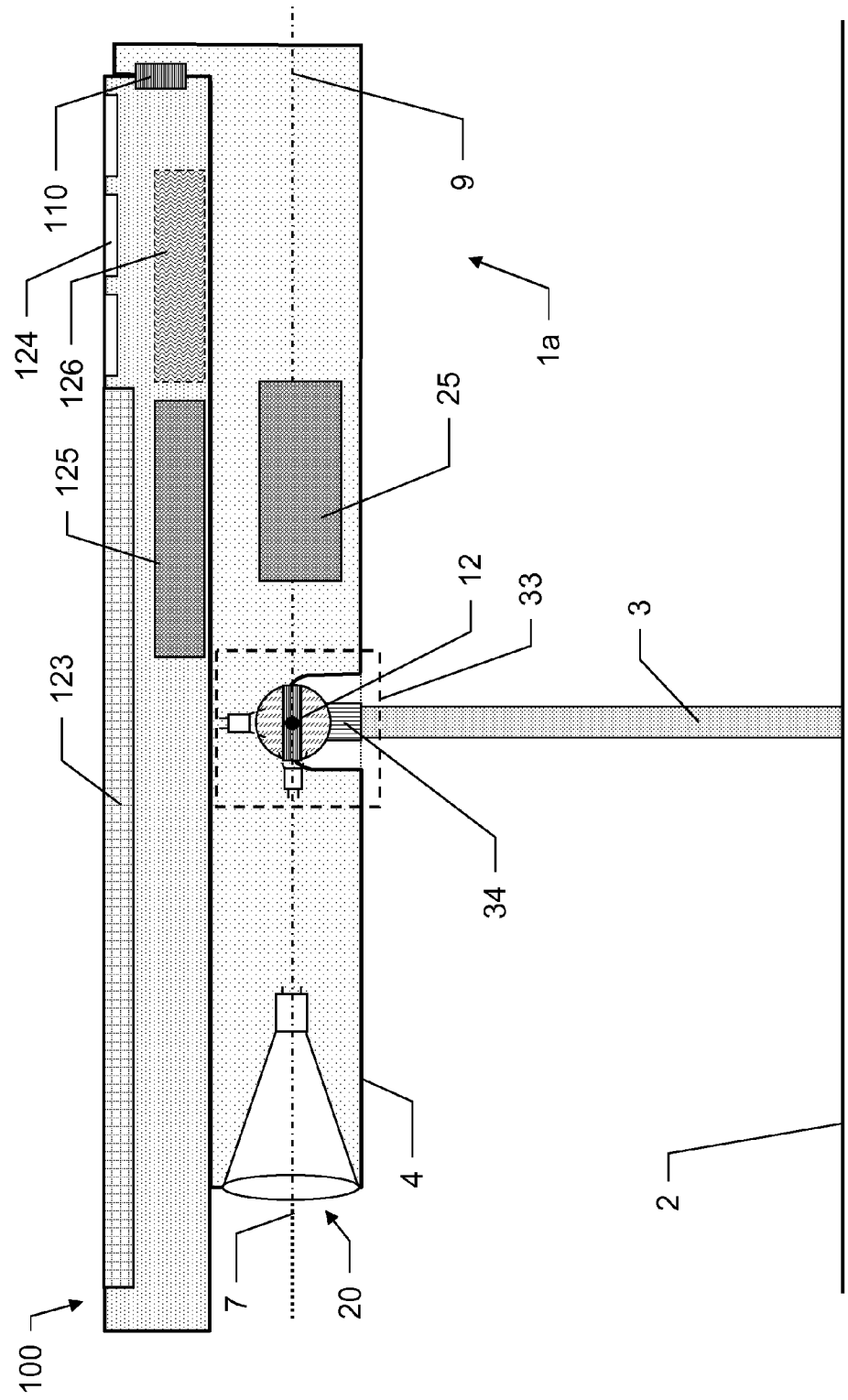
FIG. 10 shows an embodiment of the hand-held distance measuring device according to the invention as an attachment module for a smartphone, in a longitudinal sectional view.

FIG. 10 depicts a further embodiment of the hand-held distance measuring device according to the invention. In this embodiment, the device is embodied as an attachment module 1*a*, which is embodied for the mechanical connection to a hand-held small computer, for example a so-called smartphone or tablet computer. Here, a smartphone 100 is depicted, which is attached onto the hand-held attachment module 1*a*, wherein data interchange between the attachment module 1*a* and smartphone 100 is made possible by means of a standardized data interface 110, for example embodied as a USB interface. The attachment module 1*a* has neither a display nor input means; the objects thereof are instead provided by the display 123 and the input means 124 of the smartphone 100. An inclination sensor can be dispensed with in the attachment module 1*a* since the depicted smartphone 100 comprises an inclination sensor 126. The attachment module 1*a* contains a laser rangefinder 20 with a laser beam 7 emitted in the emission direction 9 and, at the rotational point 12, an angle determining unit 33. The axis of the emission direction 9 preferably extends through the rotational point 12.

It is understood that these depicted figures only schematically illustrate possible example embodiments. The various approaches can likewise be combined with one another and with methods and devices from the prior art.

What is claimed is:

1. A hand-held distance measuring device comprising:
   a housing;
   a distance measuring unit for measuring distances to spatial points along an emission direction in a space;
   an evaluation component;
   a dimensionally stable referencing support; and
   an angle determining unit for determining a rotational angle ($\alpha$, $\beta$) between the housing and the referencing support, wherein:
      a first end of the referencing support is connected via a hinge joint to the housing in a manner rotatable about a rotational point, at least about a transverse axis orthogonal to the emission direction and a vertical axis, wherein the housing comprises a cutout and the referencing support and the housing are conditioned and adapted to one another in such a way that:
         the referencing support can be brought by a folding-out movement from a passive position, in which it is inserted into the cutout, into a referencing position, in which, with a second end, it is fixable to a reference point of a reference object; and
      a location of the housing in relation to the space and/or relative to the reference point is determinable in a fully automatic manner when fixing the referencing support on the reference point.

2. The distance measuring device as claimed in claim 1, wherein the angle determining unit contains at least one rotary encoder, which is configured to register at least one horizontal rotational angle ($\alpha$) about the vertical axis between the housing and the referencing support.

3. The distance measuring device as claimed in claim 2, wherein the angle determining unit contains at least two rotary encoders, which are configured to register at least one horizontal rotational angle ($\alpha$) about the vertical axis and a vertical tilt angle ($\beta$) about the transverse axis between the housing and the referencing support.

4. The distance measuring device as claimed in claim 1, further comprising at least one inclination sensor, which is configured to establish an alignment of the distance measuring device in the space to establish an alignment of the referencing support in the space.

5. The distance measuring device as claimed in claim 1, further comprising at least one inclination sensor, which is configured to establish an alignment of the distance measuring device in the space to register at least one vertical tilt angle ($\beta$) of the housing about a rotational point.

6. The distance measuring device as claimed in claim 1, wherein the evaluation component is configured:
   to derive and provide the measured distances;
   to derive and provide measured angles ($\alpha$, $\beta$);
   to calculate and provide a distance between two measured spatial points;
   to calculate and provide an oblique distance and/or a height difference between two measured spatial points; and/or
   to calculate and provide positions in a three-dimensional local coordinate system.

7. The distance measuring device as claimed in claim 1, wherein:
   the referencing support and the cutout are designed in such a way that the referencing support can be brought from the passive position into the referencing position and back into the passive position by a folding-out movement about the hinge joint.

8. The distance measuring device as claimed in claim 1, wherein it is embodied as an attachment module for connection with a hand-held small computer, wherein measurement data are transferable wirelessly or via a data interface.

9. The distance measuring device as claimed in claim 1, wherein it is embodied as an attachment module for connection with a smartphone or a tablet computer, wherein measurement data are transferable wirelessly or via a data interface.

10. The distance measuring device as claimed in claim 1, further comprising at least one of:
    a camera for recording images in the direction of the emission direction;
    a display for displaying images recorded by means of the camera and/or measured and calculated distances and angles ($\alpha$, $\beta$); and/or
    input means, for selecting functions.

11. The distance measuring device as claimed in claim 1, wherein the distance measuring unit comprises a laser rangefinder.

12. The distance measuring device as claimed in claim 1, wherein the angle determining unit comprises at least one rotary encoder.

13. A method for a hand-held distance measuring device for establishing geometric data in a space, wherein the geometric data comprise coordinates of spatial points, a distance between two spatial points, and/or angles ($\alpha$, $\beta$), the method comprising:
    folding out a referencing support from a passive position, in which it is inserted into a cutout of a housing of the device, into a referencing position, in which, with a second end, it is fixable to a reference point of a reference object,
    measuring a distance in a first emission direction to a first spatial point and registering a first alignment of the housing relative to the space in the first emission direction; and
    measuring a distance in a second emission direction to a second spatial point and registering a second alignment of the housing relative to the space in the second emission direction;
    wherein:
       the second end of the referencing support is fixed on a reference point of a reference object for the period of the measurement sequence;
       the first and the second alignment of the housing is registered by means of an angle determining unit determining a rotational angle ($\alpha$, $\beta$) between the housing and the referencing support;
       for the purposes of establishing the geometric data, the measured distances are put into relation with one another on the basis of the first and the second registered alignment of the housing; and
       the knowledge about the fixation of the second end of the referencing support on the reference point.

14. The method as claimed in claim 13, wherein:
    an alignment of the housing and/or of the referencing support in the space is dynamically continuously established during the measurement of the distance to a spatial point; and
    distances are also calculated on the basis of the established changes in the alignment of the referencing support in the space.

15. The method as claimed in claim 13, wherein the distance between two spatial points being calculated by triangulation.

16. The method as claimed in claim 13, wherein the distance between two spatial points being calculated by the law of cosines and by the measured distances to the spatial points and at least one angle ($\alpha$, $\beta$) between a first emission direction and a second emission direction.

17. The method as claimed in claim 13, further comprising:
- measuring the distances to at least two spatial points, wherein:
  - the vertical alignment and the horizontal alignment of the housing is registered during each distance measurement;
  - the relative location of the reference object in relation to the spatial points remains unchanged during the measurement; and
  - calculating the coordinates of at least two measured spatial points.

18. The method as claimed in claim 13, wherein:
- a horizontal plane is defined on the basis of the coordinates of a spatial point and, optionally, a distance of a second spatial point to this plane is established; and/or
- on the basis of the coordinates of at least two spatial points;
- a distance is established between two spatial points; and/or
- a path of a straight line through two spatial points is established and, optionally, a distance of a third spatial point or a parallel line, which is defined by a third spatial point, from this straight line is established.

19. The method as claimed in claim 13, wherein the handheld distance measuring device is equipped with:
- at least one rangefinder with an emission direction, for measuring the distance to at least one spatial point; and
- an evaluation component for deriving and providing the measured distances;
- wherein the referencing support:
  - comprises a first end and a second end;
  - can assume a passive position and a referencing position on the housing;
  - in the passive position is inserted into the cutout in the housing, attached to the housing in a manner lying flat against the latter; and
  - in the referencing position, is connected to the housing with the first end in a manner rotatable at least about a vertical axis and can be contacted with the reference point of the reference object with the second end.

20. One or more non-transitory computer-readable media storing one or more programs that are configured, when executed, to cause one or more processors to execute the method as recited in claim 13.

* * * * *